US012023533B2

(12) United States Patent
Penden

(10) Patent No.: US 12,023,533 B2
(45) Date of Patent: Jul. 2, 2024

(54) FIRE SUPPRESSION APPARATUS VALVE ASSEMBLY

(71) Applicant: Carrier Corporation, Palm Beach Gardens, FL (US)

(72) Inventor: Karl Fredrik Penden, Rumford, RI (US)

(73) Assignee: CARRIER CORPORATION, Palm Beach Gardens, FL (US)

(*) Notice: Subject to any disclaimer, the term of this patent is extended or adjusted under 35 U.S.C. 154(b) by 447 days.

(21) Appl. No.: 16/973,311

(22) PCT Filed: Aug. 7, 2019

(86) PCT No.: PCT/US2019/045467
§ 371 (c)(1),
(2) Date: Dec. 8, 2020

(87) PCT Pub. No.: WO2020/046548
PCT Pub. Date: Mar. 5, 2020

(65) Prior Publication Data

US 2021/0244983 A1 Aug. 12, 2021

Related U.S. Application Data

(60) Provisional application No. 62/723,266, filed on Aug. 27, 2018.

(51) Int. Cl.
*A62C 35/68* (2006.01)
*A62C 35/02* (2006.01)

(52) U.S. Cl.
CPC ............ *A62C 35/68* (2013.01); *A62C 35/023* (2013.01)

(58) Field of Classification Search
CPC ....... A62C 35/68; A62C 35/023; A62C 35/08; A62C 35/10; A62C 37/14
USPC ................ 169/58, 19–22, 26–30, 71, 72, 74
See application file for complete search history.

(56) References Cited

U.S. PATENT DOCUMENTS

| | | | |
|---|---|---|---|
| 2,238,686 | A | 4/1941 | Ensminger |
| 3,604,511 | A | 9/1971 | Griffith |
| 4,889,189 | A | 12/1989 | Rozniecki |
| 5,069,291 | A | 12/1991 | O'Connell |

(Continued)

FOREIGN PATENT DOCUMENTS

| | | | |
|---|---|---|---|
| EP | 0848197 | A1 | 6/1998 |
| EP | 3072557 | A1 | 9/2016 |

(Continued)

OTHER PUBLICATIONS

International Search Report Application No. PCT/US2019/045467; dated Oct. 22, 2019; pp. 6.

(Continued)

*Primary Examiner* — Christopher S Kim
(74) *Attorney, Agent, or Firm* — CANTOR COLBURN LLP

(57) ABSTRACT

A fire suppression apparatus includes a valve assembly connected to a container holding a fire suppressant. The valve assembly includes a valve body and a first disc. The valve body defines a passageway that extends between a first valve body end and a second valve body end. The first disc is disposed within the passageway. The first disc has a first disc body defining a perforation that extends completely through the first disc body.

10 Claims, 3 Drawing Sheets

(56) References Cited

U.S. PATENT DOCUMENTS

| | | | | |
|---|---|---|---|---|
| 5,647,438 | A * | 7/1997 | Chatrathi | A62C 37/36 169/37 |
| 5,816,330 | A | 10/1998 | Billiard et al. | |
| 6,006,842 | A | 12/1999 | Stilwell et al. | |
| 6,732,809 | B2 | 5/2004 | Karadizian et al. | |
| 9,192,798 | B2 | 11/2015 | Dunster et al. | |
| 9,302,128 | B2 | 4/2016 | Dunster et al. | |
| 9,333,380 | B2 | 5/2016 | Ehlers et al. | |
| 9,649,520 | B2 | 5/2017 | Frasure et al. | |
| 2011/0155398 | A1 | 6/2011 | Holland et al. | |
| 2017/0307095 | A1 | 10/2017 | Wilson et al. | |

FOREIGN PATENT DOCUMENTS

| | | | |
|---|---|---|---|
| GB | 519881 | A | 4/1940 |
| WO | 2005088178 | A | 9/2005 |

OTHER PUBLICATIONS

Written Opinion Application No. PCT/US2019/045467; dated Oct. 22, 2019: pp. 11.

* cited by examiner

FIRE SUPPRESSION APPARATUS VALVE ASSEMBLY

BACKGROUND

Fire extinguisher systems are arranged to rapidly disperse an extinguishing agent following a thermal event. Typically, the extinguishing agent is sealed within a bottle or a container and a piston assembly may be provided to balance pressure within the bottle or container.

SUMMARY

Disclosed is a fire suppression apparatus that includes a valve assembly connected to a container holding a fire suppressant. The valve assembly includes a valve body and a first disc. The valve body defines a passageway that extends between a first valve body end and a second valve body end. The first disc is disposed within the passageway. The first disc has a first disc body defining a perforation that extends completely through the first disc body.

In addition to one or more of the features described above, or as an alternative to any of the foregoing embodiments, the first disc is disposed between the first valve body end and the second valve body end.

In addition to one or more of the features described above, or as an alternative to any of the foregoing embodiments, the valve assembly further comprising: a second disc disposed within the passageway and disposed proximate the second end.

In addition to one or more of the features described above, or as an alternative to any of the foregoing embodiments, a first chamber is defined between the first valve body end and the first disc.

In addition to one or more of the features described above, or as an alternative to any of the foregoing embodiments, a second chamber is defined between the first disc and the second disc.

In addition to one or more of the features described above, or as an alternative to any of the foregoing embodiments, the perforation of the first disc is arranged to facilitate a pressure balance between the first chamber and the second chamber.

In addition to one or more of the features described above, or as an alternative to any of the foregoing embodiments, the passageway defines an inlet that extends from the first valve body end towards the first chamber.

In addition to one or more of the features described above, or as an alternative to any of the foregoing embodiments, the passageway defines a diffuser that extends between the inlet and the first chamber.

In addition to one or more of the features described above, or as an alternative to any of the foregoing embodiments, the inlet has a first cross-sectional form and the first chamber has a second cross-sectional form that is greater than the first cross-sectional form.

In addition to one or more of the features described above, or as an alternative to any of the foregoing embodiments, a vent valve is arranged to evacuate the second chamber.

In addition to one or more of the features described above, or as an alternative to any of the foregoing embodiments, the second valve body end defines a discharge port within which the second disc is disposed.

Also disclosed is a fire suppression apparatus that includes a valve assembly having a valve body and a disc assembly. The valve body defines a passageway that extends between a first valve body end and a second valve body end. The disc assembly is disposed within the passageway and includes a first disc and a second disc. The first disc is disposed within the passageway and is disposed between the first valve body end and the second valve body end. The first disc includes a first disc body having a rim and defines a perforation that extends from the rim towards a center of the first disc body. The second disc is disposed within the passageway and is disposed proximate the second valve body end.

In addition to one or more of the features described above, or as an alternative to any of the foregoing embodiments, a first chamber is defined between the first valve body end and the first disc.

In addition to one or more of the features described above, or as an alternative to any of the foregoing embodiments, a second chamber is defined between the first disc and the second disc.

In addition to one or more of the features described above, or as an alternative to any of the foregoing embodiments, the perforation define a bleed path between the first chamber and the second chamber.

Further disclosed is a method of providing a valve assembly for a fire suppression apparatus. The method includes providing a first valve body member having a seating surface; disposing a first disc on the seating surface, the first disc having a perforation that extends completely through the first disc; providing a second valve body member having an end surface; and inserting the second valve body member into the first valve body member such that the end surface engages the first disc.

In addition to one or more of the features described above, or as an alternative to any of the foregoing embodiments, the perforation defines a bleed path between a first chamber that is defined between a first valve body end of the first valve body member and the first disc and a second chamber that is defined between a second valve body end of the second valve body member and the first disc.

In addition to one or more of the features described above, or as an alternative to any of the foregoing embodiments, disposing a second disc on a disc seat defined by the second valve body member.

In addition to one or more of the features described above, or as an alternative to any of the foregoing embodiments, inserting the first valve body member into a container holding fire suppressant.

These and other advantages and features will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting the same, it is to be understood that the disclosed embodiments are merely illustrative of the present disclosure that may be embodied in various and alternative forms. Various elements of the disclosed embodiments may be combined or omitted to form further embodiments of the present disclosure. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
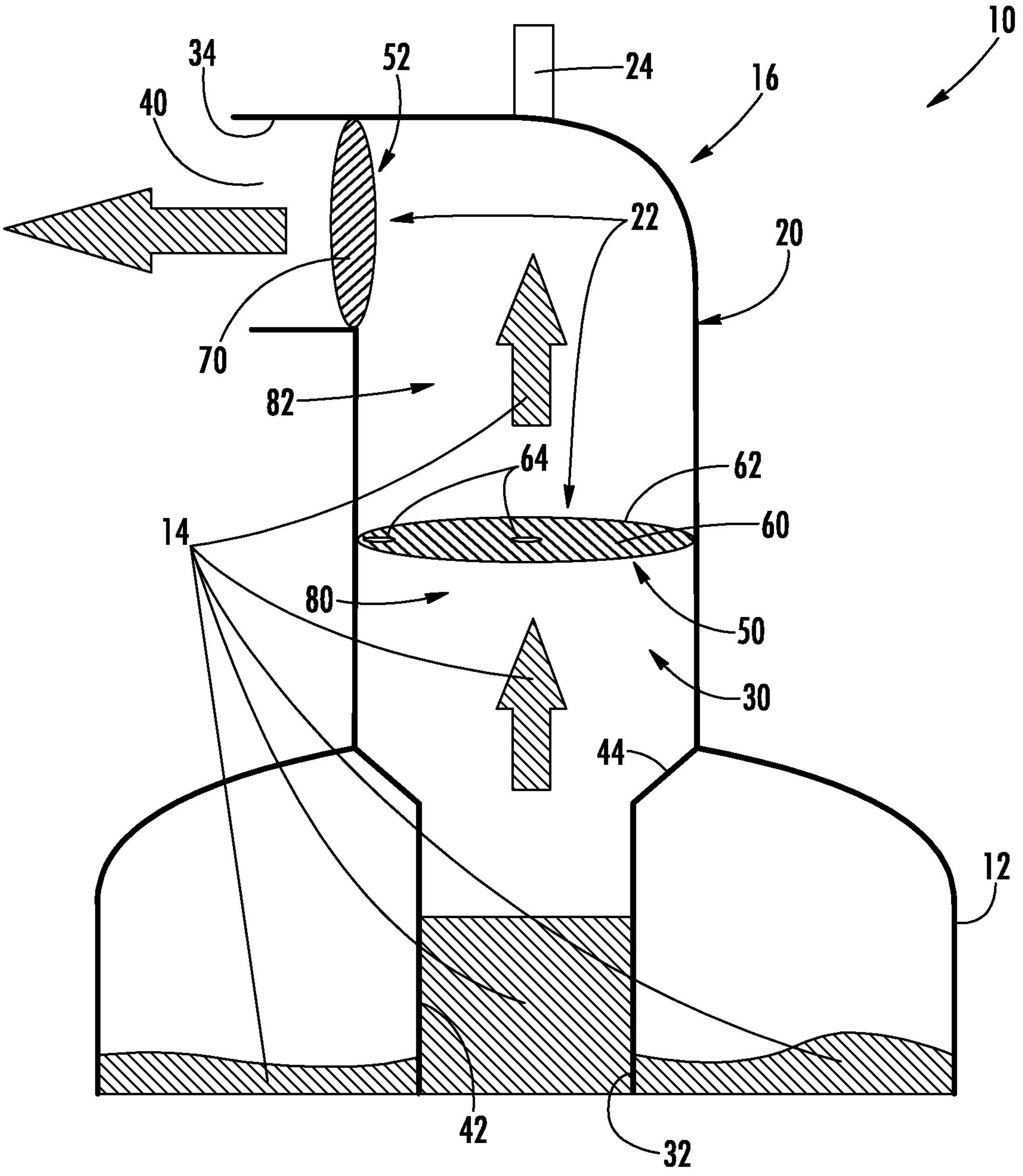
FIG. 1 is a partial section view of a fire suppression apparatus having a valve assembly.

Referring to FIG. 1, a fire suppression apparatus 10 is shown. The fire suppression apparatus 10 includes a container 12 (partially shown) that holds a fire suppressant 14, and a valve assembly 16.

The container 12 may be an extinguisher bottle or cylinder that receives the pressurized fire suppressant 14 or other extinguishing agent. The container 12 is fluidly connected to the valve assembly 16 that facilitates the delivery of the fire suppressant 14, responsive to a thermal event. The fire suppressant 14 may be a liquid suppression agent or extinguishing agent.

The valve assembly 16 extends into the container 12 and is arranged to selectively facilitate a fluid flow of the fire suppressant 14 from the container 12 towards an environment in which a thermal event may be present. The valve assembly 16 includes a valve body 20, a disc assembly 22, and a vent valve 24.

The valve body 20 defines a passageway 30 that extends between a first valve body end 32 and a second valve body end 34. The first valve body end 32 extends into the container 12. The second valve body end 34 is spaced apart from the container 12 and defines an outlet port or a discharge port 40. The discharge port 40 is fluidly connected to a fluid delivery device such as an exit hose, discharge housing, or the like that may deliver or direct the fire suppressant 14 towards a thermal event.

Figure 2:
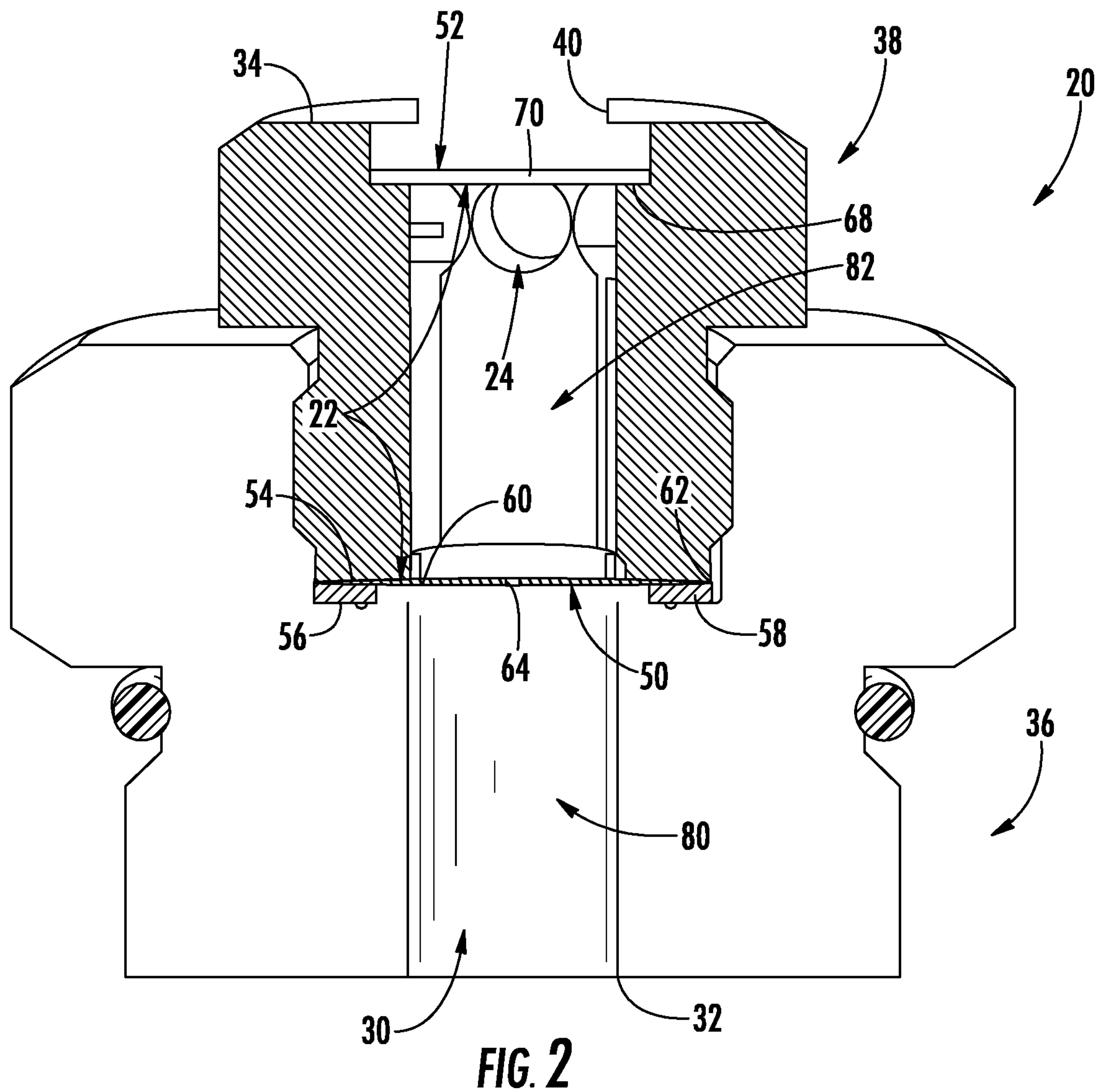
FIG. 2 is a partial section view of a valve body of the fire suppression apparatus.

Referring to FIG. 2, the valve body 20 may be at least partially defined by a first valve body member 36 and a second valve body member 38. The first valve body member 36 may extend into and be connected to the container 12. The second valve body member 38 is at least partially received within the first valve body member 36. The second valve body member 38 is arranged as a retainer that retains a disc of the disc assembly 22 between the first valve body member 36 and the second valve body member 38. The first valve body end 32 may be defined by an end of the first valve body member 36 and the second valve body end 34 may be defined by the second valve body member 38. The passageway 30 extends through and is defined by the combination of the first valve body member 36 and the second valve body member 38.

Referring to FIG. 1, the passageway 30 includes or defines an inlet 42, a diffuser 44, and in some embodiments, the discharge port 40. The inlet 42 extends from a distal end of the first valve body end 32 towards the diffuser 44 and a first chamber 80. The diffuser 44 extends between the inlet 42 and the first chamber 80. The diffuser 44 provides an expansion between the inlet 42 and the remainder of the passageway 30. The diffuser 44 is sized such that the inlet 42 has a first cross-sectional form and the remainder of the passageway 30 between the diffuser 44 and the discharge port 40 has a second cross-sectional form that is greater than the first cross-sectional form. In some embodiments, the diffuser 44 may not be provided such that the second cross-sectional form is generally equal to or less than the first cross-sectional form.

The disc assembly 22 is disposed within the passageway 30 of the valve body 20. The disc assembly 22 may be provided in lieu of piston assemblies to balance a fluid pressure between the container 12 and the passageway 30 of the valve body 20. The disc assembly 22 includes a first disc 50 and a second disc 52.

The first disc 50 is disposed within the passageway 30 and is disposed between the first valve body end 32 and the second valve body end 34. The first disc 50 extends completely across the passageway 30 and engages an inner surface of the valve body 20. Referring to FIG. 2, the first disc 50 is disposed between an end surface 54 of the second valve body member 38 and a seating surface 56 of the first valve body member 36. A washer 58 is disposed on the seating surface 56 of the first valve body member 36 and is disposed between the first disc 50 and the seating surface 56.

The first disc 50 may be made of a metallic material having good corrosion resistance such as nickel, copper, Monel, steel alloy, or the like. The first disc 50 may not be provided with a coating or a polymer layer to seal the first disc 50.

Figure 3:
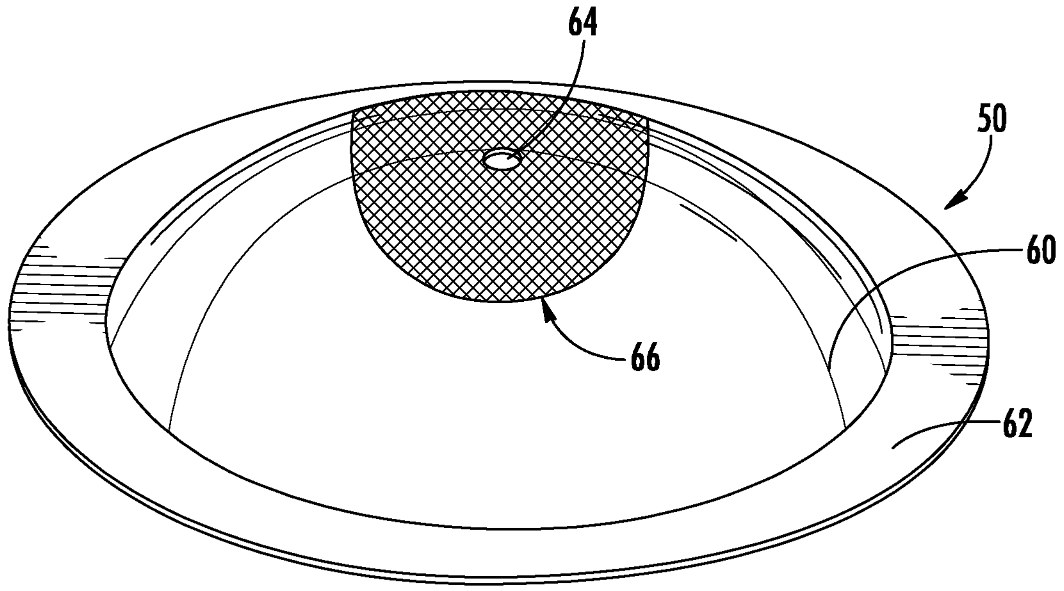
FIG. 3 is a perspective view of a disc.
Figure 4:
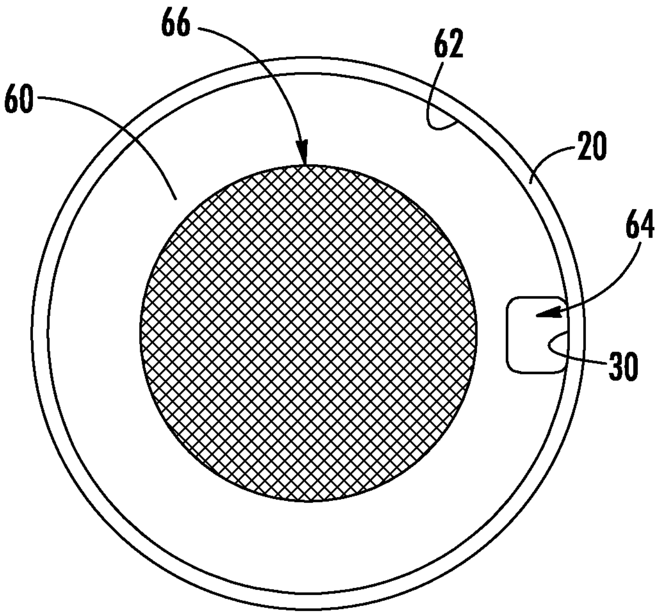
FIG. 4 is a plan view of a disc.

Referring to FIGS. 3 and 4, the first disc 50 includes a first disc body 60 having a rim 62. The first disc body 60 may include a dome shaped portion that is circumscribed by the rim 62. The dome shaped portion extends towards the first valve body end 32 or extends towards the second valve body end 34. In at least one embodiment, the first disc body 60 may be a generally flat body or planar body. The first disc body 60 may be provided with a patterned portion or patterned region 66 to facilitate the bursting of the first disc 50 within a predetermined pressure or burst range. The patterned portion or patterned region 66 locally weakens the first disc 50 to encourage bursting or the first disc 50 within the patterned portion or patterned region 66.

The rim 62 is disposed about the first disc body 60. A circumferential edge of the rim 62 engages an interior surface of the passageway 30 of the valve body 20.

The first disc body 60 defines a perforation 64 that extends completely through a center or a central region of the first disc body 60, as shown in FIG. 3, or the perforation 64 may extend from a circumferential edge of the rim 62 towards the center of the first disc body 60, as shown in FIG. 4. The perforation 64 extends completely through the first disc body 60 through the patterned portion or patterned region 66 and the perforation 64 in conjunction with the patterned portion or patterned region 66 facilitates or enables the first disc 50 to burst within a predetermined pressure or burst range. A coating, seal, or polymer layer does not extend across the perforation 64 such that perforation 64 is an opening free of any obstructions.

The perforation 64 arranges the first disc 50 as a semi-permeable disc valve. In at least one embodiment, multiple perforations 64 may be defined by the first disc body 60.

The second disc 52 is disposed within the passageway 30 and is disposed between the first disc 50 and the second valve body end 34. The second disc 52 may be disposed on a disc seat 68 of the second valve body member 38 that is disposed proximate the second valve body end 34, as shown in FIG. 2. The second disc 52 is disposed proximate the second valve body end 34 and in some embodiments, the second disc 52 is disposed within the discharge port 40.

The second disc 52 includes a second disc body 70 that extends completely across the passageway 30 and engages an interior surface of the valve body 20. The second disc body 70 may not be provided with any perforations and may be a generally solid disc.

Referring to FIGS. 1 and 2, a first chamber 80 is defined between the first valve body end 32 and the first disc 50. A second chamber 82 is defined between the first disc 50 and the second disc 52. The second chamber 82 may be a valve chamber that is separated from the pressurized container 12 by the first disc 50. A portion of the passageway 30 within the second chamber 82 may define a bend that is located between the first disc 50 and the second valve body end 34. The bend may be a 90° bend or turn, however other arrangements are also possible.

The perforation 64 of the first disc 50 is arranged to facilitate a pressure balance between the first chamber 80 and the second chamber 82, such as due to temperature fluctuations that may vary a pressure within the first chamber 80 and/or the second chamber 82. In such an arrangement, the perforation 64 of the first disc 50 defines a bleed path or leak path between the first chamber 80 and the second chamber 82 that facilitates the pressure balance between the first chamber 80 and the second chamber 82, prior to a thermal event. The perforation 64 of the first disc 50 allows for the pressure on both sides of the first disc 50 to remain in equilibrium prior to a thermal event. The perforation 64 is sized to enable fluid communication between the first chamber 80 and the second chamber 82.

The perforation 64 may have a cross-sectional form or cross-sectional diameter that is less than a thickness of the first disc 50. In at least one embodiment, the perforation 64 may have a cross-sectional form or cross-sectional diameter that is greater than or equal to a thickness of the first disc 50.

In at least one embodiment, the first disc 50 and the second disc 52 may be generally solid discs that are disposed within the passageway 30. The second disc 52 may extend completely across the passageway 30, blocking the discharge port 40. The first disc 50 may define a discontinuity or a perforation 64 that extends from an edge of the rim 62 towards the center of the first disc body 60. The discontinuity or perforation 64 may be disposed adjacent to and spaced apart from a patterned portion or patterned region 66 of the first disc 50.

The vent valve 24 is connected to the valve body 20 and extends into the second chamber 82. The vent valve 24 may be disposed between the first disc 50 and the second disc 52. The vent valve 24 may be a controlled valve, such as a controlled Schrader valve, that is arranged to facilitate the evacuation of a fluid (e.g. vented fire suppressant 14 from the first chamber 80 to the second chamber 82 or vice versa) from within the second chamber 82 through the vent valve 24 to an external environment, responsive to a thermal event. The evacuation of the fluid from the within the second chamber 82 to an external environment reduces a fluid pressure within the second chamber 82 such that there is a pressure difference across the first disc 50. The vent valve 24 may extend through the second valve body member 38, as shown in FIG. 2.

In at least one embodiment, the vent valve 24 may be disposed at the second valve body end 34 and the discharge port 40 may be disposed between the first disc 50 and the vent valve 24. In such an arrangement, the second disc 52 may be disposed in the discharge port 40 such that the second disc 52 is disposed between the first disc 50 and the vent valve 24. In such an arrangement, head losses within the second chamber 82 may be reduced by inhibiting the turning of the fire suppressant 14 within the second chamber 82 and allowing the fire suppressant 14 to flow straight through the passageway 30 therefore improving the delivery of the fire suppressant 14.

The vent valve 24 evacuates the second chamber 82, responsive to a thermal event. The evacuation of the second chamber 82 via the vent valve 24 results in a reduction of the pressure within the second chamber 82 such that a pressure difference across the first disc 50 or between the first chamber 80 and the second chamber 82, exceeds a threshold pressure difference, causing the flow of the fire suppressant 14 to burst the first disc 50. The bursting of the first disc 50 allows the fire suppressant 14 to enter the inlet 42, expand through the diffuser 44, and flow into the second chamber 82 where a rapid deceleration within the second chamber 82 may utilize the hammer effect or water hammer effect to burst the second disc 52 and facilitate the delivery of the fire suppressant 14 through the discharge port 40.

The arrangement of the disc assembly 22 may replace a piston assembly and punch pin, thus reducing the overall cost of the fire suppression apparatus 10 while also providing a more robust valve assembly 16 with minimal moving parts because pressure differences burst the first disc 50 and the water hammer effect bursts the second disc 52 instead of mechanical devices. The disc assembly 22 replaces a piston assembly with a perforated disc to balance fluid pressures between chambers of the fire suppression apparatus 10 due to ambient temperature changes. Post-actuation of the fire suppression apparatus 10, rebuilds of the fire suppression apparatus 10 may be easier to perform and less expensive by simply replacing the disc assembly 22 instead of replacing piston assemblies.

A method of providing a valve assembly 16 for the fire suppression apparatus 10 according to the following method. Providing the first valve body member 36. Disposing the washer 58 on the seating surface 56 of the first valve body member 36. Providing the first disc 50 having the perforation. Disposing the first disc 50 having the perforation 64 on at least one of the seating surface 56 of the first valve body member 36 or on the washer 58. Providing the second valve body member 38. Inserting the second valve body member 38 into the first valve body member 36 such that the end surface 54 of the second valve body member 38 engages the first disc 50. Providing the second disc 52. Disposing the second disc 52 on the disc seat 68 of the second valve body member 38 such that the second disc is disposed within the second valve body member 38. Inserting the vent valve 24 onto or into the second valve body member 38. Inserting the first valve body member 36 into the container 12 such that the valve assembly 16 (e.g. the valve body 20, the disc assembly 22, and the vent valve 24) is installed onto the container 12.

Replacement of the disc assembly 22 may be performed according to the following method. Removing the second valve body member 38 from the first valve body member 36. Removing the burst first disc 50 from within the first valve body member 36. Disposing the first disc 50 having the perforation 64 onto at least one of the washer 58 or the seating surface 56 of the first valve body member 36. Removing the burst second disc 52 from the second valve body member 38. Disposing the second disc 52 onto the disc seat 68 of the second valve body member 38. Inserting the second valve body member 38 into the first valve body member 36 such that the end surface 54 of the second valve body member 38 engages the first disc 50. Inserting the first valve body member 36 into the container 12 such that the valve assembly 16 (e.g. the valve body 20, the disc assembly 22, and the vent valve 24) is installed onto the container 12.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description.

What is claimed is:

1. A fire suppression apparatus, comprising:
- a valve assembly connected to a container holding a fire suppressant, the valve assembly including:
  - a valve body defining a passageway that extends between a first valve body end and a second valve body end, and
  - a first disc disposed within the passageway, the first disc having a first disc body defining a perforation that extends completely through the first disc body, the first disc having a planar body extending completely across the passageway;
  - a second disc disposed within the passageway and disposed between the first disc and the second valve body end, the second disc having a planar body extending completely across the passageway;
  - wherein a first chamber is defined within the passageway between the first valve body end and the first disc;
  - wherein a second chamber is defined within the passageway between the first disc and the second disc.

2. The fire suppression apparatus of claim 1, wherein the first disc is disposed between the first valve body end and the second valve body end.

3. The fire suppression apparatus of claim 1, wherein the perforation of the first disc is arranged to facilitate a pressure balance between the first chamber and the second chamber.

4. The fire suppression apparatus of claim 3, wherein the passageway defines an inlet that extends from the first valve body end towards the first chamber.

5. The fire suppression apparatus of claim 4, wherein the passageway defines a diffuser that extends between the inlet and the first chamber.

6. The fire suppression apparatus of claim 5, wherein the inlet has a first cross-sectional form and the first chamber has a second cross-sectional form that is greater than the first cross-sectional form.

7. The fire suppression apparatus of claim 1, further comprising: a vent valve that is arranged to evacuate the second chamber.

8. The fire suppression apparatus of claim 1, wherein the second valve body end defines a discharge port within which the second disc is disposed.

9. A fire suppression apparatus, comprising:
- a valve assembly, comprising:
- a valve body defining a passageway that extends between a first valve body end and a second valve body end; and
- a disc assembly disposed within the passageway, the disc assembly comprising:
  - a first disc disposed within the passageway and disposed between the first valve body end and the second valve body end, the first disc includes a first disc body having a rim and defines a perforation that extends from the rim towards a center of the first disc body, the first disc having a planar body extending completely across the passageway; and
  - a second disc disposed within the passageway and disposed between the first disc and the second valve body end, the second disc having a planar body extending completely across the passageway;
  - wherein a first chamber is defined within the passageway between the first valve body end and the first disc;
  - wherein a second chamber is defined within the passageway between the first disc and the second disc.

10. The fire suppression apparatus of claim 9, wherein the perforation defines a bleed path between the first chamber and the second chamber.

* * * * *